US012634887B2

(12) United States Patent
Zhou et al.

(10) Patent No.: US 12,634,887 B2
(45) Date of Patent: May 19, 2026

(54) PAGING INDICATION METHOD AND APPARATUS

(71) Applicant: HUAWEI TECHNOLOGIES CO., LTD., Shenzhen (CN)

(72) Inventors: Han Zhou, Shanghai (CN); Xiaolei Tie, Shanghai (CN); Zhanzhan Zhang, Shanghai (CN); Jingxin Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/352,463

(22) Filed: Jul. 14, 2023

(65) Prior Publication Data

US 2023/0362888 A1     Nov. 9, 2023

Related U.S. Application Data

(63) Continuation of application No. PCT/CN2021/072308, filed on Jan. 15, 2021.

(51) Int. Cl.
*H04W 68/02*          (2009.01)
*H04L 27/26*          (2006.01)
*H04W 56/00*          (2009.01)

(52) U.S. Cl.
CPC ......... *H04W 68/02* (2013.01); *H04L 27/2657* (2013.01); *H04W 56/001* (2013.01)

(58) Field of Classification Search
CPC . H04W 68/02; H04W 56/001; H04W 68/005; H04W 88/02; H04W 88/08; H04W 68/025; H04L 27/2657

USPC .......................................................... 455/458
See application file for complete search history.

(56) References Cited

U.S. PATENT DOCUMENTS

| | | | |
|---|---|---|---|
| 2021/0345294 A1* | 11/2021 | Hsieh | H04W 68/02 |
| 2022/0078710 A1* | 3/2022 | Xu | H04W 72/23 |
| 2023/0075197 A1* | 3/2023 | Xu | H04L 5/0048 |
| 2023/0309060 A1* | 9/2023 | Xu | H04W 52/0216 |

FOREIGN PATENT DOCUMENTS

CN          112136349 A     12/2020

OTHER PUBLICATIONS

Intel Corporation, "WUS Consideration for eFeMTC." 3GPP TSG RAN WG2 Meeting #101bis, R2-1804897, Revision of R2-1803302, XP051428599, Apr. 16-20, 2018, 5 pages.

* cited by examiner

*Primary Examiner* — Don N Vo
(74) *Attorney, Agent, or Firm* — Maier & Maier, PLLC

(57)          ABSTRACT

A paging indication method includes: generating a PEI, where the PEI indicates whether there is a paging message sent to a terminal on one or more POs; determining a time frequency region for sending the PEI, where the time frequency region corresponds to a synchronization signal block (SSB), a first interval is different from a second interval, the first interval is an interval between a start subcarrier of the PEI and a start subcarrier of the SSB, and the second interval is an interval between a start subcarrier of a secondary synchronization signal (SSS) and the start subcarrier of the SSB; and sending, in the time frequency region, the PEI to the terminal.

16 Claims, 10 Drawing Sheets

Generate a PEI, where the PEI indicates whether there is a paging message sent to a terminal on one or more POs — S1301

Determine a time frequency region for sending the PEI, where the time frequency region corresponds to an SSB, a first interval is different from a second interval, the first interval is an interval between a start subcarrier of the PEI and a start subcarrier of the SSB, and the second interval is an interval between a start subcarrier of an SSS and the start subcarrier of the SSB — S1302

Send, in the determined time frequency region, the PEI to the terminal — S1303

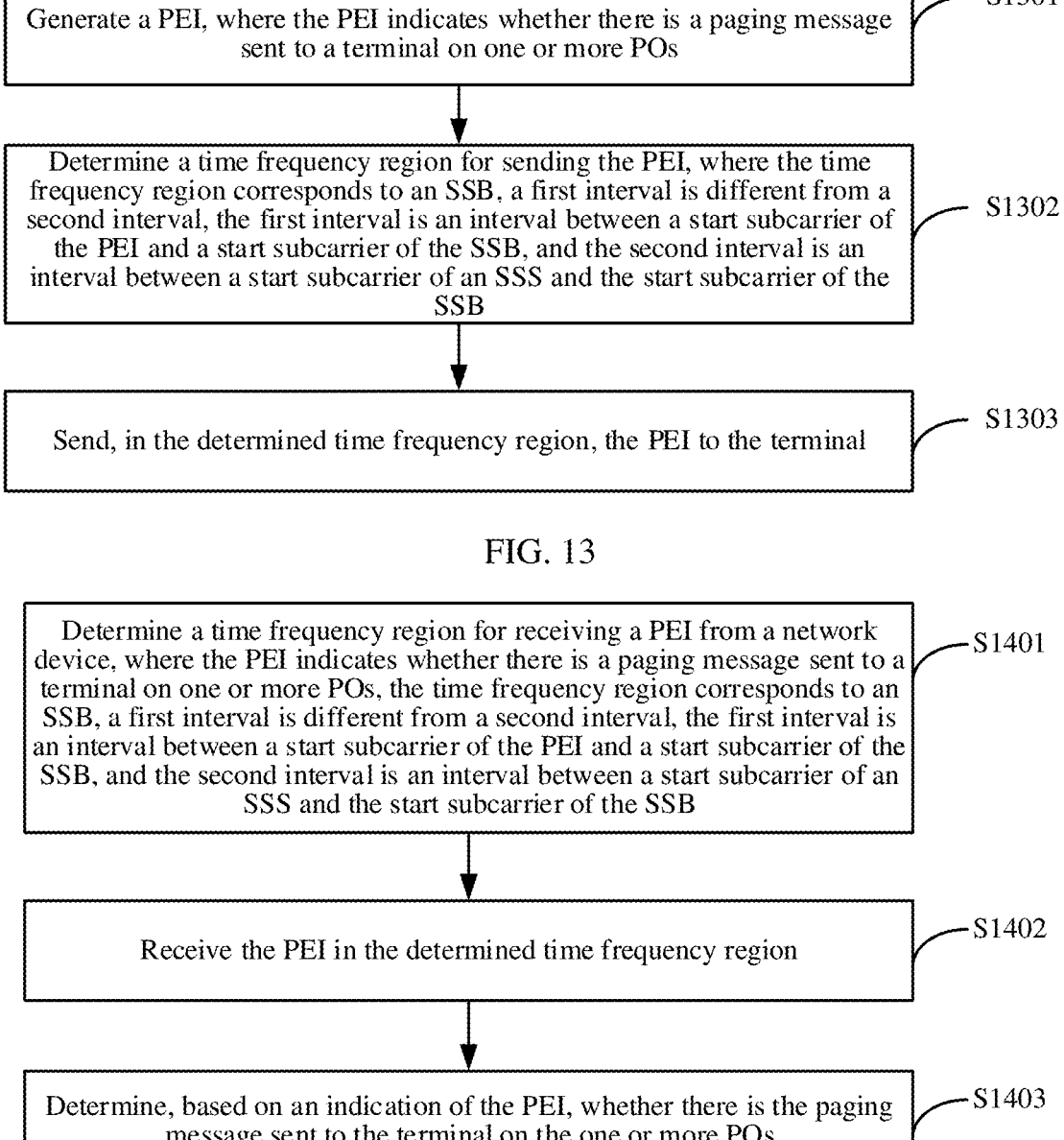

Generate a PEI, where the PEI indicates whether there is a paging message sent to a terminal on one or more POs — S1301

Determine a time frequency region for sending the PEI, where the time frequency region corresponds to an SSB, a first interval is different from a second interval, the first interval is an interval between a start subcarrier of the PEI and a start subcarrier of the SSB, and the second interval is an interval between a start subcarrier of an SSS and the start subcarrier of the SSB — S1302

Send, in the determined time frequency region, the PEI to the terminal — S1303

FIG. 13

Determine a time frequency region for receiving a PEI from a network device, where the PEI indicates whether there is a paging message sent to a terminal on one or more POs, the time frequency region corresponds to an SSB, a first interval is different from a second interval, the first interval is an interval between a start subcarrier of the PEI and a start subcarrier of the SSB, and the second interval is an interval between a start subcarrier of an SSS and the start subcarrier of the SSB — S1401

Receive the PEI in the determined time frequency region — S1402

Determine, based on an indication of the PEI, whether there is the paging message sent to the terminal on the one or more POs — S1403

FIG. 14

PAGING INDICATION METHOD AND APPARATUS

CROSS-REFERENCE TO RELATED APPLICATIONS

This application is a continuation of International Application No. PCT/CN2021/072308, filed on Jan. 15, 2021, the disclosure of which is hereby incorporated by reference in its entirety.

TECHNICAL FIELD

The embodiments relate to the field of communication technologies, a paging indication method, and an apparatus.

BACKGROUND

Paging, also referred to as a paging message, is used for triggering a terminal to establish a radio resource control (RRC) connection, notifying a terminal of a system information update, or sending an earthquake and tsunami warning. Content of the paging message is sent to the terminal through a physical downlink shared channel (PDSCH), and the PDSCH is scheduled through a physical downlink control channel (PDCCH) scrambled by using a paging radio network temporary identifier (P-RNTI).

Before receiving the paging, the terminal does not know whether a base station actually includes paging sent to the terminal. Therefore, the terminal is woken up on each paging occasion (PO), performs detection on paging downlink control information (DCI), and then receives a paging PDSCH based on scheduling of the paging DCI. Only after the terminal completely parses data on the paging PDSCH, can the terminal know whether the base station actually includes paging data sent to the terminal.

However, in an existing communication network, a probability that a base station actually sends paging to a terminal on each PO is very low. Therefore, power consumption overheads of paging receiving of the terminal on most POs are useless. This is not conducive to power consumption reduction.

SUMMARY

The embodiments may provide a paging indication method and an apparatus. A time frequency sending position of a secondary synchronization signal (SSS)—based paging early indication (PEI) may allow a terminal to be notified, by using a PEI, of whether there is paging on a PO. Therefore, power efficiency and impact of a sending position of the PEI on intra-frequency cell search and measurement of the terminal are reduced.

According to a first aspect, an embodiment may provide a paging indication method. The method is applied to a network device, and includes: generating a PEI, where the PEI indicates whether there is a paging message sent to a terminal on one or more POs; determining a time frequency region for sending the PEI, where the time frequency region corresponds to an SSB, a first interval is different from a second interval, the first interval is an interval between a start subcarrier of the PEI and a start subcarrier of the SSB, and the second interval is an interval between a start subcarrier of an SSS and the start subcarrier of the SSB; and sending, in the time frequency region, the PEI to the terminal.

In other words, the network device in this method sends the PEI to the terminal, and the terminal can be notified, by using the PEI, whether there is the paging on the PO. Therefore, power consumption is reduced. In addition, a position of the PEI is different from that of the SSS in frequency domain. This reduces impact of a sending position of the PEI on intra-frequency cell search and measurement.

The SSB in this method may be an SSB before the PO, and the PEI may be sent before the PO. The PEI may be close to the SSB before the PO. In this way, the terminal may simultaneously perform time frequency tracking and automatic gain control (AGC) by using the SSB and receive the PEI before the PO.

In a possible implementation, the generating a PEI includes: generating the PEI by using a pseudo-random sequence whose length is N, where N is any integer greater than or equal to 127.

In a possible implementation, the pseudo-random sequence whose length is N and the PEI meet the following relationships:

$$d_{PEI}(n) = [1 - 2x_0((n + m_0) \bmod N)][1 - 2x_1((n + m_1) \bmod N)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 12$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

where $d_{PEI}(n)$ represents a sequence value of an $n^{th}$ symbol in the pseudo-random sequence whose length is N; a value range of n is greater than or equal to 0 and less than N;

$$N_{ID}^{cell}$$

represents a cell identifier of a cell of the network device, and includes two identifiers:

$$N_{ID}^{(1)}$$

and $$N_{ID}^{(2)};$$

initial values of $x_0$ and $x_1$ are preset values; and mod represents a modulo operation.

In a possible implementation, N is less than or equal to 240.

In a possible implementation, the first interval indicates at least one of the following: whether one or more terminal groups that receive the paging message on the one or more POs are paged; and whether there is the paging message sent to the terminal on the one or more PO groups in the one or more POs.

In other words, in this implementation, different first intervals may indicate different terminal groups or different PO groups. This improves flexibility of a paging indication.

In a possible implementation, a frequency domain region in the time frequency region of the PEI may be within a transmitting bandwidth of the SSB or may exceed a transmitting bandwidth of the SSB (in other words, not completely within the transmitting bandwidth of the SSB).

In a possible implementation, the time frequency region is a plurality of time frequency regions. The plurality of time frequency regions may be used to repeatedly send the PEI. Alternatively, the PEI is a plurality of PEIs, and the plurality of time frequency regions are respectively used to send the plurality of PEIs.

In other words, in this implementation, one PEI may be repeatedly sent in the plurality of time frequency regions. This improves accuracy of the paging indication. Alternatively, the plurality of PEIs may be simultaneously sent, and different PEIs may indicate different terminal groups or different PO groups. This improves the flexibility of the paging indication.

In a possible implementation, the time frequency region occupies one OFDM symbol, and there are two OFDM symbols between the time frequency region and the SSS.

In other words, in this implementation, if the time frequency region of the PEI occupies one OFDM symbol, there may be two OFDM symbols between the time frequency region of the PEI and the SSS. In this way, regardless of a time location case used for sending the SSB, the terminal may receive the PEI and the SSS by using a same receiving algorithm.

In a possible implementation, the determining a time frequency region for sending the PEI includes: if there is no OFDM symbol between the SSB and another SSB that are in a same slot, and the SSB is located before the another SSB, determining a $1^{st}$ OFDM symbol located before the SSB as a time domain region in the time frequency region; if there is no OFDM symbol between the SSB and another SSB that are in a same slot, and the SSB is located after the another SSB, determining a $2^{nd}$ OFDM symbol located after the SSB as a time domain region in the time frequency region; or if there are two OFDM symbols between the SSB and another SSB that are in a same slot, determining a $2^{nd}$ OFDM symbol located after the SSB as a time domain region in the time frequency region.

According to a second aspect, an embodiment may provide a paging indication method. The method is applied to a terminal, and includes: determining a time frequency region for receiving a PEI from a network device, where the PEI indicates whether there is a paging message sent to the terminal on one or more POs, the time frequency region corresponds to an SSB, a first interval is different from a second interval, the first interval is an interval between a start subcarrier of the PEI and a start subcarrier of the SSB, and the second interval is an interval between a start subcarrier of an SSS and the start subcarrier of the SSB; receiving the PEI in the time frequency region; and determining, based on an indication of the PEI, whether there is the paging message sent to the terminal on the one or more POs.

In other words, the terminal in this method receives the PEI from the network device, and the terminal can be notified, by using the PEI, whether there is the paging on the PO. Therefore, power consumption is reduced. In addition, a position of the PEI is different from that of the SSS in frequency domain. This reduces impact of a receiving position of the PEI on intra-frequency cell search and measurement.

The SSB in this method may be an SSB before the PO, and the PEI may be sent before the PO. The PEI may be close to the SSB before the PO. In this way, the terminal may simultaneously perform time frequency tracking and AGC by using the SSB and receive the PEI before the PO.

In addition, when the terminal receives the PEI in the time frequency region of the PEI, no PEI may be received. Correspondingly, when there is no paging message sent to the terminal, the network device may not send the PEI. Correspondingly, the terminal may determine, based on whether the PEI is received, whether there is the paging message. After the PEI is received, it is determined that there is a paging message. If no PEI is received, it is determined that there is no paging message.

In a possible implementation, the PEI is generated by the network device by using a pseudo-random sequence whose length is N, and N is any integer greater than or equal to 127.

In a possible implementation, N is less than or equal to 240.

In a possible implementation, a frequency domain region in the time frequency region of the PEI may be within a transmitting bandwidth of the SSB or may exceed a transmitting bandwidth of the SSB (in other words, not completely within the transmitting bandwidth of the SSB).

In a possible implementation, the first interval indicates at least one of the following: whether one or more terminal groups that receive the paging message on the one or more POs are paged; and whether there is the paging message sent to the terminal on the one or more PO groups in the one or more POs.

In other words, in this implementation, different first intervals may indicate different terminal groups or different PO groups. This improves flexibility of a paging indication.

In a possible implementation, the time frequency region is a plurality of time frequency regions. The plurality of time frequency regions may be used to repeatedly send the PEI. Alternatively, there a plurality of PEIs, and the plurality of time frequency regions are respectively used to send the plurality of PEIs. The receiving the PEI in the time frequency region includes: if the plurality of time frequency regions are used to repeatedly send the PEI, selecting one or more time frequency regions from the plurality of time frequency regions to receive the PEI; or if the plurality of time frequency regions are respectively used to send the plurality of PEIs, receiving the plurality of PEIs in the plurality of time frequency regions.

In other words, in this implementation, one PEI may be repeatedly received in the plurality of time frequency regions. This improves accuracy of the paging indication. Alternatively, the plurality of PEIs may be simultaneously received, and different PEIs may indicate different terminal groups or different PO groups. This improves the flexibility of the paging indication.

In a possible implementation, the time frequency region occupies one OFDM symbol, and there are two OFDM symbols between the time frequency region and the SSS.

In other words, in this implementation, if the time frequency region of the PEI occupies one OFDM symbol, there may be two OFDM symbols between the time frequency region of the PEI and the SSS. In this way, regardless of a time location case used for sending the SSB, the terminal may receive the PEI and the SSS by using a same receiving algorithm.

In a possible implementation, the determining a time frequency region for receiving a PEI from a network device includes: if there is no OFDM symbol between the SSB and another SSB that are in a same slot, and the SSB is located before the another SSB, determining a $1^{st}$ OFDM symbol located before the SSB as a time domain region in the time frequency region; if there is no OFDM symbol between the SSB and another SSB that are in a same slot, and the SSB is located after the another SSB, determining a $2^{nd}$ OFDM symbol located after the SSB as a time domain region in the time frequency region; or if there are two OFDM symbols between the SSB and another SSB that are in a same slot, determining a $2^{nd}$ OFDM symbol located after the SSB as a time domain region in the time frequency region.

According to a third aspect, an embodiment may provide a paging indication apparatus. The apparatus may include modules, for example, a processing module and a transceiver module, configured to perform the method according to any one of the first aspect or the possible implementations of the first aspect. The transceiver module may include a sending module and a receiving module. The sending module and the receiving module may be different functional modules or may be a same functional module but can implement different functions. The processing module may be implemented via a processor. The transceiver module may be implemented via a transceiver. Correspondingly, the sending module may be implemented via a transmitter, and the receiving module may be implemented via a receiver. If the apparatus is a network device, the transceiver may be a radio frequency transceiver component in the network device. If the apparatus is a chip disposed in a network device, the transceiver may be a communication interface in the chip, and the communication interface is connected to a radio frequency transceiver component in the network device, to implement information receiving and sending via the radio frequency transceiver component.

According to a fourth aspect, an embodiment may provide a paging indication apparatus. The apparatus may include modules, for example, a processing module and a transceiver module, configured to perform the method according to any one of the second aspect or the possible implementations of the second aspect. The transceiver module may include a sending module and a receiving module. The sending module and the receiving module may be different functional modules or may be a same functional module but can implement different functions. The processing module may be implemented via a processor. The transceiver module may be implemented via a transceiver. Correspondingly, the sending module may be implemented via a transmitter, and the receiving module may be implemented via a receiver. If the apparatus is a terminal, the transceiver may be a radio frequency transceiver component in the terminal. If the apparatus is a chip disposed in a terminal, the transceiver may be a communication interface in the chip, and the communication interface is connected to a radio frequency transceiver component in the terminal, to implement information receiving and sending via the radio frequency transceiver component.

According to a fifth aspect, an embodiment may provide a paging indication system, including a network device and a terminal. The network device is configured to perform the method according to the first aspect, and the terminal is configured to perform the method according to the second aspect.

According to a sixth aspect, an embodiment may provide a non-transitory computer storage medium. The non-transitory computer storage medium includes computer instructions. When the computer instructions are run, the method according to the first aspect is performed.

According to a seventh aspect, an embodiment may provide a non-transitory computer storage medium. The non-transitory computer storage medium includes computer instructions. When the computer instructions are run, the method according to the second aspect is performed.

According to an eighth aspect, an embodiment may provide a computer program product. The computer program product includes computer instructions. When the computer instructions are run, the method according to the first aspect is performed.

According to a ninth aspect, an embodiment may provide a computer program product. The computer program product includes computer instructions. When the computer instructions are run, the method according to the second aspect is performed.

BRIEF DESCRIPTION OF THE DRAWINGS

FIG. 13 is a schematic flowchart of a paging indication method according to an embodiment;

FIG. 14 is a schematic flowchart of a paging indication method according to an embodiment;

DETAILED DESCRIPTION OF THE EMBODIMENTS

Figures 1, 2, 3, 4:
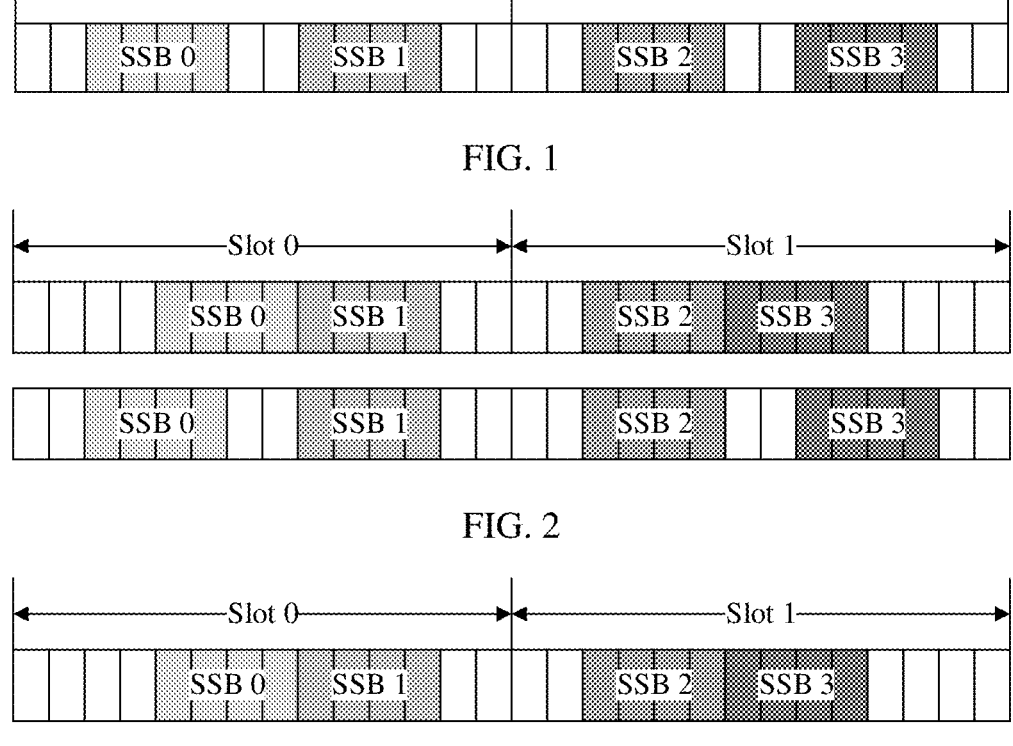
FIG. 1 is a schematic diagram of a time domain multiplexing pattern.
FIG. 2 is a schematic diagram of a time domain multiplexing pattern.
FIG. 3 is a schematic diagram of a time domain multiplexing pattern.
FIG. 4 is a schematic diagram of a time domain multiplexing pattern.

The following describes the embodiments with reference to the accompanying drawings. It is clear that the described embodiments are merely some but not all of the embodiments.

In the descriptions, "an embodiment", "some embodiments", or the like indicates that one or more embodiments include a feature, structure, or characteristic. Therefore, statements such as "in an embodiment", "in some embodiments", "in some other embodiments", and "in other embodiments" do not necessarily refer to a same embodiment. Instead, the statements mean "one or more but not all of embodiments", unless otherwise emphasized in another manner.

In the descriptions, "/" means "or" unless otherwise specified. For example, A/B may represent A or B, and "and/or" describes merely an association relationship between associated objects and represents that three relationships may exist. For example, A and/or B may represent the following three cases: only A exists, both A and B exist, and only B exists. In addition, in the descriptions, "a plurality of" means two or more.

Unless otherwise specified, an expression similar to an expression that "an item includes at least one of the following: A, B, and C" may represent any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C In the foregoing descriptions, three elements A, B, and C are used as an example to describe an optional case of the item. When more elements are included in the expression, a meaning of the expression may be obtained according to the foregoing rule.

In the descriptions, terms "first" and "second" are merely intended for description and shall not be understood as an indication or implication of relative importance or implicit indication of a quantity of indicated features. Therefore, a feature limited by "first" or "second" may explicitly or implicitly include one or more features. Terms "comprise", "include", "have", and their variants all mean "include, but are not limited to", unless otherwise emphasized in another manner.

The following first describes key technologies in the embodiments.

1. Power Saving Technology

The 3$^{rd}$ generation partnership project (3GPP) standards organization is currently formulating a protocol standard for a 5$^{th}$ generation (5G) cellular mobile communication system. The system is also referred to as new radio (NR). In comparison with a long term evolution (LTE) system, NR supports a larger transmission bandwidth, more transceiver antenna arrays, a higher transmission rate, and a more flexible scheduling mechanism at a smaller granularity. The foregoing features of NR provide more application scopes, but power consumption of a terminal is greatly increased.

To reduce power consumption of the terminal, a research project of power saving is introduced in NR, for researching possible power consumption reduction solutions for the terminal in various states (including a connected state, an idle state, and an inactive state). How to reduce the power consumption of the terminal in the idle state and the inactive state is a research key point.

The idle state is a state in which the terminal completes camping in a cell but does not perform a random access process. The terminal may enter the idle state after being powered on or after RRC is released.

The idle state corresponds to the connected state. The connected state is a state in which the terminal does not perform RRC release after completing the random access process. The terminal in the connected state may perform data transmission with a network device. When the terminal is in the idle state, the terminal switches to the connected state after completing the random access process. When the terminal is in the connected state, the terminal switch to the idle state after performing the RRC release.

The inactive state is a state between the connected state and the idle state. For the terminal in the inactive state, a user plane bearer of an air interface is suspended, and a user plane bearer and a control plane bearer between a radio access network (RAN) and a core network (CN) are still maintained. When the terminal initiates a call or service request, the user plane bearer of the air interface needs to be activated, and the existing user plane bearer and the existing control plane bearer between the RAN and the CN are reused.

2. Paging Mechanism

Paging is also referred to as a paging message, for triggering a terminal to establish an RRC connection, notifying a terminal of a system information update, or sending an earthquake and tsunami warning, or the like. Content of the paging message is sent to the terminal through a PDSCH, and the PDSCH is scheduled through a PDCCH scrambled by using a P-RNTI.

A process in which the terminal obtains the paging message is as follows. The terminal in an idle state or an inactive state is periodically woken up. After being woken up, the terminal monitors the PDCCH scrambled by using the P-RNTI, and parses DCI in the PDCCH to determine information about a position (for example, a time frequency position) of the PDSCH. The terminal receives the PDSCH based on the information about the position of the PDSCH and obtains the paging message on the PDSCH. The terminal determines whether the paging message includes a terminal identifier of the terminal. If the paging message includes the terminal identifier of the terminal, the terminal performs a corresponding operation (for example, establishes an RRC connection or falls back from the inactive state to the idle state).

A time for the terminal receiving the paging is defined by a paging frame (PF) and a paging occasion (PO). The PF represents a frame for sending the paging. The terminal in the idle state and the inactive state may attempt to receive the paging only in the PF. The PO represents an occasion for receiving the paging in one PF. Because the paging message is actually scheduled by using DCI scrambled by using a P-RNTI, one PO actually corresponds to a detection occasion of DCI scrambled by using S P-RNTIs. S may be obtained based on a quantity of system messages.

The PF is defined according to the following formula:

$$(SFN+PF\_\text{offset})\bmod T = (T \operatorname{div} N) \times (UE\_ID \bmod N),$$
where SFN is a system frame number;
PF_offset is a frame offset of the PF;
T, a time unit, is a discontinuous reception (DRX) periodicity, and may be understood as that the terminal may have one or more occasions to attempt to receive the paging within time T;
N is a quantity of PFs included in each DRX periodicity; and
UE_ID is a UE identifier that may be a 5G-S-TMSI mod 1024 or a full I-RNTI.

When an SFN meets the foregoing formula, the SFN is considered as a PF. The terminal attempts to receive the paging within the PF.

Each PF may correspond to a plurality of POs. NR uses a parameter Ns to represent a quantity of POs corresponding to one PF.

It should be noted that, a network device does not send the paging message to the terminal on each PO, and the terminal performs detection on paging DCI on the PO to determine whether a network sends the paging.

3. Beam Measurement and Synchronization Signal Block (SSB)

The SSB may also be referred to as a synchronization signal and physical broadcast channel (SS/PBCH) block.

A beam is a space communication resource, and a network device or a terminal may perform, by using an antenna array, beamforming on a transmitting beam in an analog manner, a digital manner, or a hybrid manner. Different beams may be different space resources. Therefore, same information may be sent by using different beams to cover a plurality of different space regions, or different information may be sent to maximize space resources.

Beams may be classified into a transmitting beam and a receiving beam of the network device and a transmitting beam and a receiving beam of the terminal.

A synchronization and broadcast channel in an NR network may be sent by using the foregoing plurality of beams, and there is a sending periodicity (which may be 20 ms in a low frequency band). In each periodicity, a cell may send SSBs of a plurality of different beams in a time division manner. SSBs of all different beams in one periodicity form an SSB burst set. In an NR system, SSBs of different beams are multiplexed based on different working frequency bands and different time domain patterns.

For example, when a subcarrier interval between SSBs is 15 kHz, a time domain multiplexing pattern of the SSBs is a pattern shown in FIG. 1, such as a time location case A of the SSBs.

For another example, when a subcarrier interval between SSBs is 30 kHz, time domain multiplexing patterns of the SSBs are two patterns in FIG. 2, such as time location cases B and C of the SSBs.

For another example, when a subcarrier interval between SSBs is 120 kHz, a time domain multiplexing pattern of the SSBs is a pattern shown in FIG. 3.

For another example, when a subcarrier interval between SSBs is 240 kHz, a time domain multiplexing pattern of the SSBs is a pattern shown in FIG. 4.

Figure 5:
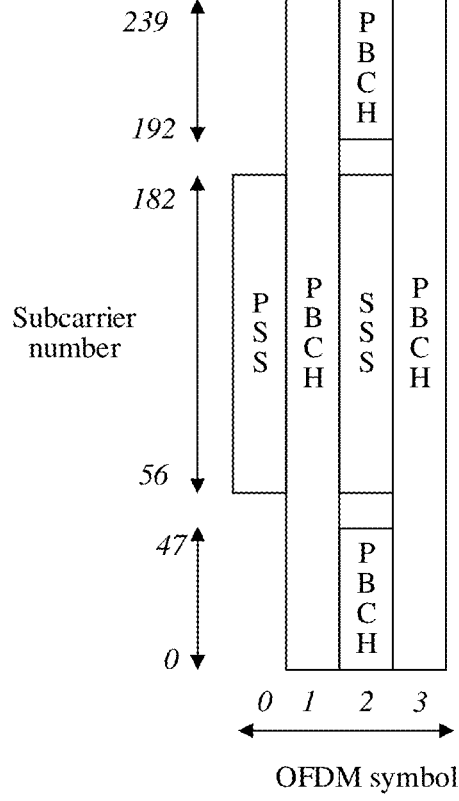
FIG. 5 is a schematic diagram of content carried in an SSB.

In FIG. 1 to FIG. 4, an SSB 0, an SSB 1, an SSB 2, and an SSB 3 each represent an SSB in a beam direction, and a number following the SSB represents an index of the SSB. Each SSB occupies four orthogonal frequency division multiplexing (OFDM) symbols in time domain of each SSB. The network device may choose to send an SSB of one beam, SSBs of two beams, SSBs of four beams, and SSBs of eight beams. Content carried in the four symbols of the SSB is shown in FIG. 5.

A bandwidth of the SSB is 20 resource blocks (RBs), and the SSB includes 240 subcarriers (in other words, a subcarrier number=240). The $1^{st}$ symbol is a primary synchronization signal (PSS) including 127 subcarriers. In other words, a sequence length of the PSS is 127. The PSS occupies only a middle part of the SSB, and the two end parts of the SSB do not send other data or control information. The $2^{nd}$ and $4^{th}$ symbols are physical broadcast channels (PBCHs), which may be carrying system information. The $3^{rd}$ symbol carries both PBCHs and an SSS. A sequence length of the SSS and the sequence length of the PSS are both 127, and both occupy 127 resource elements (RE) in the middle part of the SSB. Two end parts of the SSS respectively use 48 REs to send the PBCHs, and there are eight REs between one end part of the SSS and the PBCH, and nine REs between the other end part of the SSS and the PBCH.

When being powered on to camp on a cell or hands over to a cell, the terminal may measure a plurality of SSBs in one SSB periodicity of the cell, determine a beam having best receiving quality, and use beam quality of the measured SSBs as a reference for beam selection in subsequent cell access and uplink/downlink data transmission.

Figure 6:
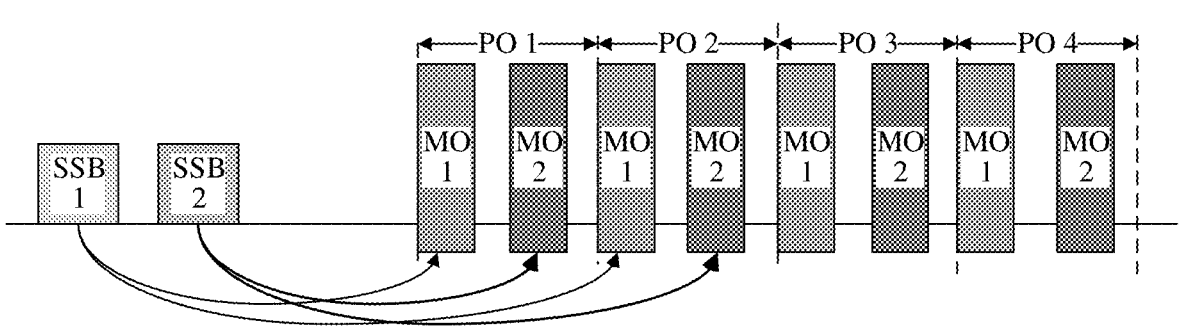
FIG. 6 is a schematic diagram of a correspondence between SSBs and MOs.

Paging is used as an example. On each PO, there are M paging PDCCH monitoring occasions (MOs). A quantity of M is the same as a quantity of SSBs of different beams configured for a cell, and each SSB corresponds to one MO on the PO. In other words, a beam of a paging PDCCH sent on the MO is the same as that of the corresponding SSB. Content of the paging PDCCH sent on different MOs is the same. Therefore, the terminal may select, based on a beam measurement result of the SSB, an MO having best receiving performance to receive the paging PDCCH, or may receive a plurality of paging PDCCHs in a beam polling manner. For example, as shown in FIG. 6, a cell is configured with two SSBs and four POs. Therefore, there are two MOs that may send a paging PDCCH on each PO, and an SSB 1 and an SSB 2 respectively corresponds to an MO 1 and an MO 2 in one PO.

Optionally, the beam may further correspond to information associated with a reference signal resource of the network device. A reference signal may be a channel state information reference signal (CSI-RS), an SSB, a demodulation reference signal (DMRS), a phase tracking reference signal (PTRS), a tracking reference signal (TRS), or the like. The information associated with the reference signal resource may be a reference signal resource identifier, quasi-co-location (QCL) information (such as QCL of a type D), or the like. The reference signal resource identifier corresponds to a transmitting and receiving beam pair that is established during measurement performed based on the reference signal resource. The terminal may infer beam information by using an index of the reference signal resource.

Optionally, the beam may further correspond to a spatial domain filter or a spatial domain transmission filter.

4. Working Procedure of Terminal Wakeup

Before a terminal is woken up in an idle state and an inactive state to attempt to receive paging, some parameters of a receiver need to be adjusted first to ensure receiving performance. The adjustment may include the following steps.

Time frequency tracking is also referred to as time frequency synchronization. Due to a limitation of manufacturing costs, precision of a frequency generation crystal oscillator used by the terminal is not high. Consequently, after the terminal is powered on and runs for a period of time, time and a working frequency maintained by the terminal deviate from a clock and frequency of a network. Therefore, a base station may need to send a reference signal for the terminal to estimate a timing offset, a frequency domain offset, delay spread, and Doppler spread between the terminal and the base station and compensate for a time frequency offset of the terminal. In the idle state, the terminal may perform preliminary time frequency tracking by receiving an SSB. In a connected state, the terminal may further receive a channel state information reference signal (CSI-RS) for tracking. The channel state information reference signal may also be referred to as a tracking RS (TRS), to perform fine time frequency tracking.

Automatic gain control (AGC) may be for adjusting signal output power of a baseband circuit and signal output power of a radio frequency circuit based on power of a received signal. In the idle state, the terminal may perform AGC estimation by receiving an SSB.

In addition to the foregoing operations, the terminal may further need to perform operations such as signal-to-interference ratio (SIR) estimation and beam measurement.

5. Paging Indication (PI)

Before receiving paging, a terminal does not know whether a network device actually includes paging sent to the terminal. Therefore, the terminal is woken up on each PO, performs detection on paging DCI, and then receives paging PDSCH based on scheduling of the paging DCI.

Only after the terminal completely parses paging PDSCH data, can the terminal know whether a network side includes paging data sent to the terminal. In an existing communication network, a probability that a base station actually sends paging to a terminal on each PO is very low. Therefore, paging receiving of the terminal on most POs is useless power consumption overheads. This is not conducive to power consumption reduction.

It should be noted that the embodiments may be applied to NR in an idle state and an inactive state.

A PI concept is introduced in 3GPP to reduce power consumption for receiving paging in an idle state and an inactive state. The PI may be sent before the PO. If the PI indicates that there is no paging, the terminal may enter a sleep mode after receiving an SSB and the PI and does not need to receive the paging DCI and PDSCH on the PO, to reduce the power consumption. In NR, the PI is referred to as a paging early indication (PEI).

Figure 7:
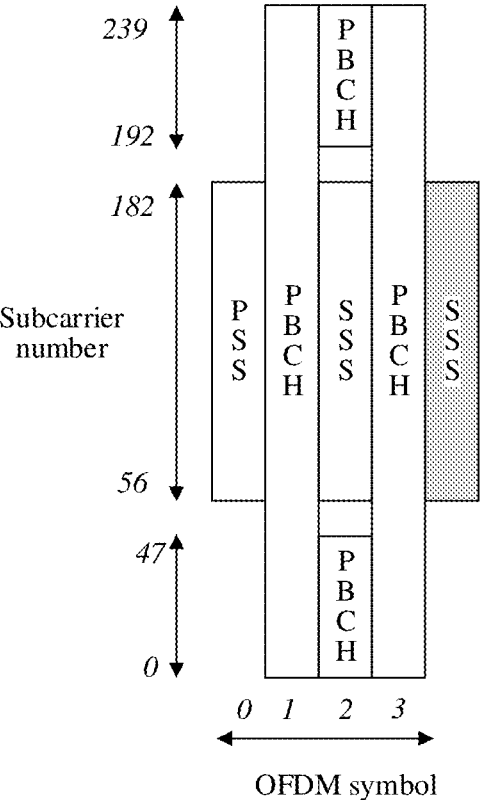
FIG. 7 is a schematic diagram of a PEI.

The PEI may be sent in a manner of DCI, an SSS, or a CSI-RS. That the PEI is sent by using the SSS means that, as shown in FIG. 7, the PEI is represented by using a sequence generated in a same sequence generation manner as that of the SSS. When including the paging sent to the terminal, the network device sends the SSS-based PEI. Otherwise, the network device does not send the PEI. The terminal determines whether the paging sent to the terminal is included by detecting whether the PEI is sent.

However, when the PEI uses an SSS sequence, a terminal of a neighboring cell may incorrectly estimate a combination of a PEI of a cell A and a PSS of a cell B as a new cell that does not exist when performing cell search. Therefore, cell search and measurement of the terminal are interfered. In addition, a length of the SSS sequence is only 127, and performance in multipath fading channel is bad. Therefore, there may be a probability that the terminal misses detecting the PEI or incorrectly detects another signal as the PEI (in other words, a false alarm occurs).

Therefore, the embodiment may provide a paging indication method and an apparatus, to resolve a problem that the SSS-based PEI affects cell search of the terminal. Impact of an SSS sending position on intra-frequency cell search and measurement in the foregoing first solution may be reduced by a time frequency sending position of the SSS-based PEI.

The terminal may be user equipment (UE), a mobile station (MS), a mobile terminal (MT), or the like, and is a device that provides voice and/or data connectivity for a user. For example, the terminal is a handheld device or a vehicle-mounted device that has a wireless connection function. Currently, for example, the terminal is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

The network device may be a radio access network (RAN) node or a RAN device that enables a terminal to access a wireless network or may be referred to as a base station. Currently, examples of some RAN nodes are: a next generation NodeB (gNB), a transmission reception point (TRP), an evolved NodeB (eNB), a radio network controller (RNC), a NodeB (NB), a base station controller (BSC), a base transceiver station (BTS), a home base station (HNB), a baseband unit (BBU), or a wireless fidelity (Wi-Fi) access point (AP).

Embodiments are provided for description below.

An example in which a length of a PEI is 127 is used for description below. In the embodiments, the length of the PEI may alternatively be greater than 127 and less than or equal to 240. An implementation process used when the length of the PEI is greater than 127 and less than or equal to 240 is similar to an implementation process used when the length of the PEI is 127. Details are not described herein.

(1) A network device sends a PEI to a terminal. The PEI indicates whether there is a paging message sent to the terminal or a terminal group on one or more corresponding POs.

(2) The PEI uses an SSS-based sequence. In other words:

The PEI uses a pseudo-random sequence whose length is 127. A formula for generating $d_{PEI}(n)$ is the same as a formula for generating a secondary synchronization sequence of a cell of the network device, in other words:

$$d_{PEI}(n) = [1 - 2x_0((n + m_0) \bmod N)][1 - 2x_1((n + m_1) \bmod N)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 12$$

$$0 \le n < 127$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

where $$N_{ID}^{cell}$$

represents a cell identifier of the cell of the network device, and includes two identifiers:

$$N_{ID}^{(1)}$$

and $$N_{ID}^{(2)};$$

initial values of $x_0$ and $x_1$ are preset values; mod represents a modulo operation; the $$N_{ID}^{(1)}$$

and $$N_{ID}^{(2)}$$

13 are preset values or values configured by a network for the terminal; and $d_{PEI}(n)$ is different from an SSS sequence of the cell of the network device, in other words, $d_{PEI}(n)$ uses a same sequence generation formula as that of the SSS, but does not use a same sequence.

Figure 8:
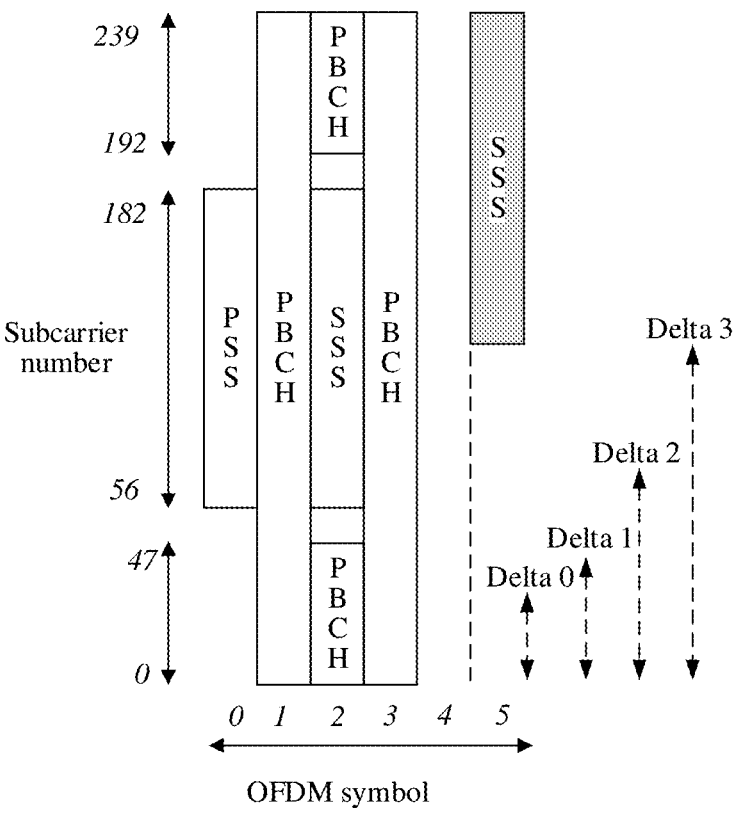
FIG. 8 is a schematic diagram of a PEI.

(3) A transmitting frequency domain region of the PEI is within a transmitting bandwidth of an SSB, and an interval between a start subcarrier of the PEI and a start subcarrier of the SSB is delta subcarriers, where delta is not equal to 56 (in other words, a position of the PEI is different from that of the SSS frequency domain), as shown in FIG. 8. The network device uses different deltas to represents that terminals in different terminal groups or on different POs are woken up.

For example, the network device divides terminals on one PO into two groups. That a PEI starts to be sent at Delta 0 represents that no terminal in the two groups is paged. That a PEI starts to be sent at Delta 1 represents that a terminal in the 1$^{st}$ group is paged, and no terminal in the 2$^{nd}$ group is paged. That a PEI starts to be sent at Delta 2 represents that no terminal in the 1$^{st}$ group is paged, and a terminal in the 2$^{nd}$ group is paged. That a PEI starts to be sent at Delta 3 represents that a terminal in each of the two groups is paged.

For another example, a PEI sent by the network device simultaneously corresponds to two POs. That the PEI starts to be sent at Delta 0 represents that no terminal is paged on the two POs. That the PEI starts to be sent at Delta 1 represents that a terminal is paged on the 1$^{st}$ PO, and no terminal is paged on the 2$^{nd}$ PO. That the PEI starts to be sent at Delta 2 represents that no terminal is paged on the 1$^{st}$ PO, and a terminal is paged on the 2$^{nd}$ PO. That the PEI starts to be sent at Delta 3 represents that a terminal is paged on each of the two POs.

As shown in FIG. 8, the PEI may send a plurality of symbols consecutively or discretely in time domain.

Figure 9:
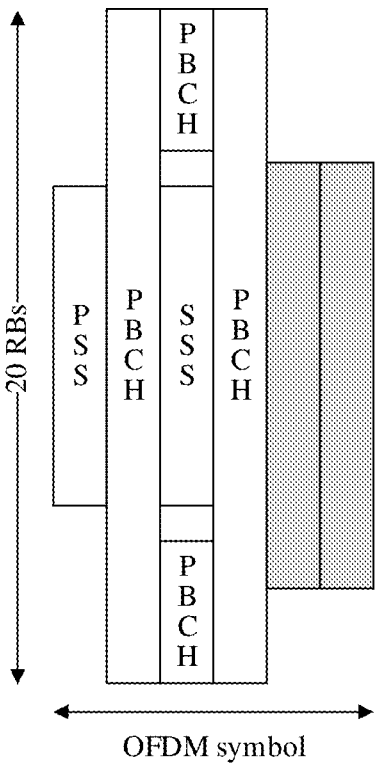
FIG. 9 is a schematic diagram of a PEI.
Figure 10:
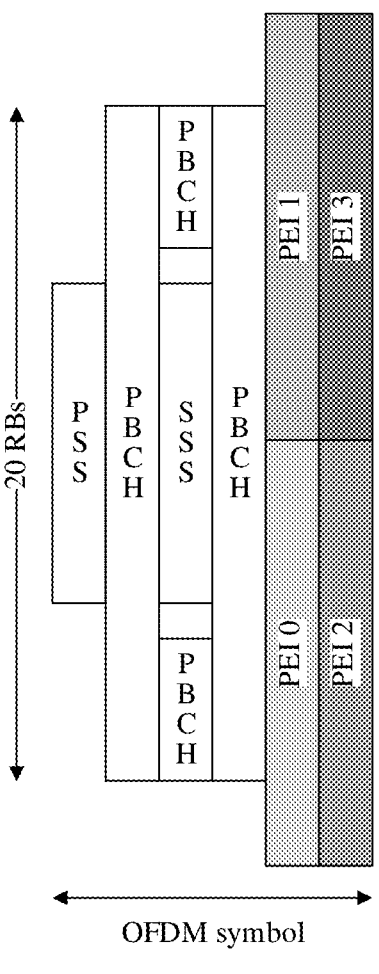
FIG. 10 is a schematic diagram of a PEI.

(4) The network device may simultaneously send a plurality of PEIs. Because an actual length of each PEI is 127, 254 subcarriers are obtained when two PEIs are combined in frequency domain. The subcarriers may exceed the bandwidth of the SSB: 240 subcarriers (20×12=240). Therefore, the bandwidth of the combined PEI may exceed the bandwidth of the SSB on both upper and lower sides in frequency domain, as shown in FIG. 9. Alternatively, the transmitting bandwidth of the SSB may be exceeded on one side, as shown in FIG. 10. Correspondingly, when receiving the plurality of PEIs, the terminal may receive only a part within the bandwidth of the SSB or may receive all 254 subcarriers. This depends on implementation of the terminal and is not limited.

The network device may alternatively consecutively send a plurality of PEIs in time domain. As shown in FIG. 9 or FIG. 10, the network device may send all of a plurality of PEIs, such as, a PEI 0, a PEI 1, a PEI 2, and a PEI 3, once, or may send only any one or more of a PEI 0, a PEI 1, a PEI 2, and a PEI 3. When the network device sends any one or more of the PEI 0, the PEI 1, the PEI 2, and the PEI 3, it may represent that terminals in different terminal groups or on different POs are woken up. For example, the PEI 0, the PEI 1, the PEI 2, and the PEI 3 respectively represent whether a PO 0, a PO 1, a PO 2, and a PO 3 are paged, or whether a terminal group 0, a terminal group 1, a terminal group 2, and a terminal group 3 are paged.

Figure 12:
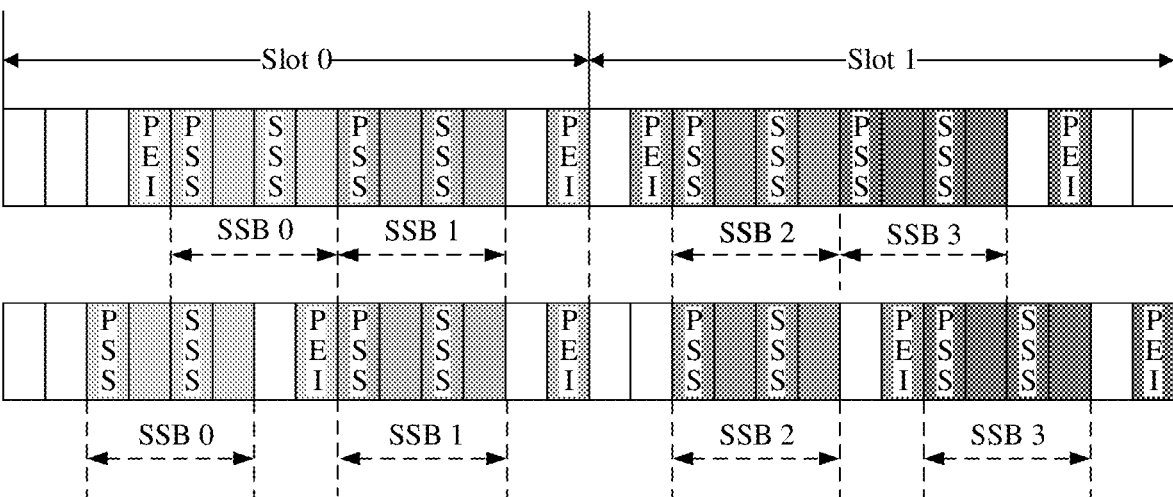
FIG. 12 is a schematic diagram of a PEI time domain multiplexing pattern.

(5) If the PEI occupies only one symbol and is sent in a slot in which the SSB is located, it is considered that there are two symbols between the PEI and the SSS in time domain. As shown in FIG. 12, if the SSB is sent by using a time location case B, a PEI of an SSB 0 and a PEI of an SSB 2 are placed on a 1$^{st}$ symbol located before a PSS, and an SSB 1 and an SSB 3 are placed on a 2$^{nd}$ symbol located after the SSB. If the SSB is sent by using a time location case A and a time location case C, all PEIs are placed on a 2$^{nd}$ symbol located after the SSB.

In addition, if the network device sends eight SSBs, positions of PEIs respectively corresponding to an SSB 4 to an SSB 7 are the same as positions of PEIs respectively corresponding to an SSB 0 to an SSB 3. Details are not described herein.

It may be understood that, when there are two symbols between the PEI and the SSS in time domain, the terminal may receive the PEI and the SSS by using a same receiving algorithm regardless of a time location case used for sending the SSB.

Next, FIG. 13 is a schematic flowchart of a paging indication method according to an embodiment. The method may be applied to a network device, for example, a gNB. As shown in FIG. 13, the paging indication method may include the following steps.

S1301: Generate a PEI. The PEI indicates whether there is a paging message sent to a terminal on one or more POs.

When the PEI is generated, a pseudo-random sequence whose length is N may be used to generate the PEI. N may be any integer greater than or equal to 127 or may be any integer greater than or equal to 127 and less than or equal to 240.

The pseudo-random sequence whose length is N and the PEI meet the following relationships:

$$d_{PEI}(n) = [1 - 2x_0((n + m_0)\bmod N)][1 - 2x_1((n + m_1)\bmod N)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 12, \text{ where}$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

where $d_{PEI}(n)$ represents a sequence value of an n$^{th}$ symbol in the pseudo-random sequence whose length is N; a value range of n is greater than or equal to 0 and less than N;

$$N_{ID}^{cell}$$

represents a cell identifier of a cell of the network device, and includes two identifiers:

$$N_{ID}^{(1)}$$

and $$N_{ID}^{(2)};$$

initial values of $x_0$ and $x_1$ are preset values; and mod represents a modulo operation.

An example in which a length of the PEI is 127 is used for description appears below. An implementation process is shown in FIG. 8 to FIG. 12.

S1302: Determine a time frequency region for sending the PEI. The time frequency region corresponds to an SSB. A first interval is different from a second interval. The first interval is an interval between a start subcarrier of the PEI and a start subcarrier of the SSB, and the second interval is an interval between a start subcarrier of an SSS and the start subcarrier of the SSB.

That the time frequency region corresponds to an SSB may be understood as that there is an association relationship between the time frequency region of the PEI and a time frequency region of the SSB. For example, when the PEI is set to be sent near an SSB, it may be considered that there is a correspondence between the PEI and the SSB. The SSS is an SSS in the SSB corresponding to the time frequency region. In addition, when the length of the PEI is different from a length of the SSS in the corresponding SSB, for example, when the length of the SSS is 127, and the length of the PEI is greater than 127, the first interval may be the same as the second interval. In other words, that the first interval is different from the second interval may be replaced with that a frequency domain region of the PEI is different from a frequency domain region of the SSS. Different intervals or different lengths may be considered as different frequency domain regions.

Figure 11:
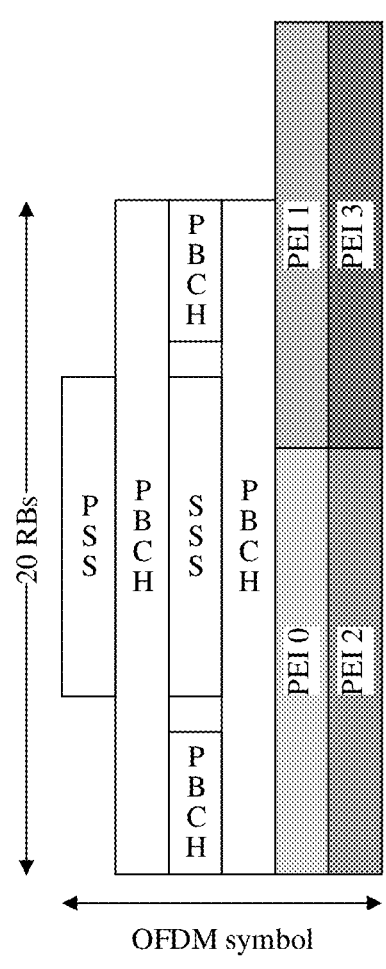
FIG. 11 is a schematic diagram of a PEI.

A frequency domain region in the time frequency region of the PEI may be within a transmitting bandwidth of the SSB, as shown in FIG. 8 or FIG. 9, or may exceed a transmitting bandwidth of the SSB (in other words, not completely within the transmitting bandwidth of the SSB), as shown in FIG. 10 or FIG. 11. A time domain region in the time frequency region of the PEI may include one OFDM symbol, as shown in FIG. 8, or may include a plurality of OFDM symbols, as shown in FIG. 9, FIG. 10, or FIG. 11. The plurality of OFDM symbols may include a plurality of consecutive OFDM symbols, as shown in FIG. 9, FIG. 10, or FIG. 11, or may include a plurality of discrete OFDM symbols.

The first interval may indicate at least one of the following: whether one or more terminal groups that receive the paging message on the one or more POs are paged; and whether there is the paging message sent to the terminal on the one or more PO groups in the one or more POs.

A quantity of the plurality of POs may be less than or equal to 4 or may be an actual quantity of POs corresponding to a plurality of PFs in one DRX periodicity. For example, one DRX periodicity includes two PFs, and each PF includes four POs. In this case, an actual quantity of POs corresponding to one PEI is 8. In this case, the eight POs may be grouped, and different first intervals indicate different PO groups. Terminal groups that perform detection on paging DCI on the eight POs may alternatively be grouped, and different first intervals indicate different terminal groups.

It may be understood that the first intervals may indicate different terminal groups or may indicate different PO groups. This improves diversity of a paging indication.

There may be a plurality of time frequency regions of the PEI. The plurality of time frequency regions may be used to repeatedly send the PEI. Alternatively, the PEI is a plurality of PEIs, and the plurality of time frequency regions are respectively used to send the plurality of PEIs.

It may be understood that one PEI may be repeatedly sent in the plurality of time frequency regions. As shown in FIG.

9, FIG. 10, or FIG. 11, one PEI is repeatedly sent at positions of a PEI 0, a PEI 1, a PEI 2, and a PEI 3. Alternatively, the plurality of PEIs may be sent simultaneously. As shown in FIG. 9, FIG. 10, or FIG. 11, four PEIs are simultaneously sent at positions of a PEI 0, a PEI 1, a PEI 2, and a PEI 3.

The time frequency region of the PEI may occupy one OFDM symbol, and there are two OFDM symbols between the time frequency region of the PEI and the SSS.

It may be understood that, if the time frequency region of the PEI occupies one OFDM symbol, there may be two OFDM symbols between the time frequency region of the PEI and the SSS. In this way, regardless of a time location case used for sending the SSB, the terminal may receive the PEI and the SSS by using a same receiving algorithm.

When the time frequency region for sending the PEI is determined, the following three cases may be included.

Case 1: If there is no OFDM symbol between the SSB and another SSB that are in a same slot, and the SSB is located before the another SSB, a $1^{st}$ OFDM symbol located before the SSB is determined as a time domain region in the time frequency region.

Case 2: If there is no OFDM symbol between the SSB and another SSB that are in a same slot, and the SSB is located after the another SSB, a $2^{nd}$ OFDM symbol located after the SSB is determined as a time domain region in the time frequency region.

Case 3: If there are two OFDM symbols between the SSB and another SSB that are in a same slot, a $2^{nd}$ OFDM symbol located after the SSB is determined as a time domain region in the time frequency region.

As shown in FIG. 12, there may be two time location cases. In a first case, there is no OFDM symbol between two SSBs in a same slot. In the other case, there are two OFDM symbols between two SSBs in a same slot.

For the first time location case, an SSB 0 is located before an SSB 1, and a $1^{st}$ OFDM symbol located before the SSB 0 may be determined as the time domain region in the time frequency region of the PEI. Alternatively, an SSB 1 is located after an SSB 0, and a $2^{nd}$ OFDM symbol located after the SSB may be determined as the time domain region in the time frequency region of the PEI. Similarly, cases of an SSB 2 and an SSB 3 are the same as the foregoing. Details are not described herein again.

For the second time location case, there are two OFDM symbols between an SSB 0 and an SSB 1. For the SSB 0, a $2^{nd}$ OFDM symbol located after the SSB 0 may be determined as the time domain region in the time frequency region of the PEI. For the SSB 1, a $2^{nd}$ OFDM symbol located after the SSB 1 may be determined as the time domain region in the time frequency region of the PEI. Similarly, cases of an SSB 2 and an SSB 3 are the same as the foregoing. Details are not described herein again.

It may be understood that, regardless of a time location case used for sending the SSB, there may be two OFDM symbols between the time frequency region of the PEI and the SSS.

If a sequence length of the PEI is greater than 127, the first interval may be different from the second interval.

S1303: Send, in the determined time frequency region, the PEI to the terminal.

The network device may use an SSS-based PEI time frequency sending position, to reduce impact of the PEI sending position on intra-frequency cell search and measurement of the existing terminal, help to carry different terminal groups or indicate whether terminals on different POs are woken up, and further reduce power consumption.

FIG. 14 is a schematic flowchart of a paging indication method according to an embodiment. The method may be applied to a terminal. As shown in FIG. 14, the paging indication method may include the following steps.

S1401: Determine a time frequency region for receiving a PEI from a network device. The PEI indicates whether there is a paging message sent to a terminal on one or more POs. The time frequency region corresponds to an SSB. A first interval is different from a second interval. The first interval is an interval between a start subcarrier of the PEI and a start subcarrier of the SSB, and the second interval is an interval between a start subcarrier of an SSS and the start subcarrier of the SSB.

The PEI may be generated by using a pseudo-random sequence whose length is N. N may be any integer greater than or equal to 127 or may be any integer greater than or equal to 127 and less than or equal to 240.

A frequency domain region in the time frequency region of the PEI may be within a transmitting bandwidth of the SSB, as shown in FIG. 8 or FIG. 9, or may exceed a transmitting bandwidth of the SSB (in other words, not completely within the transmitting bandwidth of the SSB), as shown in FIG. 10 or FIG. 11. A time domain region in time frequency region of the PEI may include one OFDM symbol, as shown in FIG. 8, or may include a plurality of OFDM symbols, as shown in FIG. 9, FIG. 10, or FIG. 11. The plurality of OFDM symbols may include a plurality of consecutive OFDM symbols, as shown in FIG. 9, FIG. 10, or FIG. 11, or may include a plurality of discrete OFDM symbols.

The first interval may indicate at least one of the following: whether one or more terminal groups that receive the paging message on the one or more POs are paged; and whether there is the paging message sent to the terminal on the one or more PO groups in the one or more POs.

A quantity of the plurality of POs may be less than or equal to 4 or may be an actual quantity of POs corresponding to a plurality of PFs in one DRX periodicity. For example, one DRX periodicity includes two PFs, and each PF includes four POs. In this case, an actual quantity of POs corresponding to one PEI is 8.

It may be understood that the first intervals may indicate different terminal groups or may indicate different PO groups. This improves diversity of a paging indication.

There may be a plurality of time frequency regions of the PEI. The plurality of time frequency regions may be used to repeatedly send the PEI. Alternatively, the PEI is a plurality of PEIs, and the plurality of time frequency regions are respectively used to send the plurality of PEIs. When the terminal receives the PEI in the determined time frequency region, the following two implementations may be included.

Manner 1: If the plurality of time frequency regions may be used to repeatedly send the PEI, one or more time frequency regions are selected from the plurality of time frequency regions to receive the PEI.

Manner 2: If the plurality of time frequency regions may be respectively used to send the plurality of PEIs, the plurality of PEIs may be received in the plurality of time frequency regions.

One PEI may be repeatedly received in the plurality of time frequency regions, or a plurality of PEIs may be received simultaneously. This improves the diversity of the paging indication.

The time frequency region may occupy one OFDM symbol, and there are two OFDM symbols between the time frequency region and the SSS.

After the time frequency region of the PEI occupies one OFDM symbol, there may be two OFDM symbols between the time frequency region of the PEI and the SSS. In this way, regardless of a time location case used for sending the SSB, the UE may receive the PEI and the SSS by using a same receiving algorithm.

When the terminal determines the time frequency region for receiving the PEI from the network device, the following three cases may be included.

Case 1: If there is no OFDM symbol between the SSB and another SSB that are in a same slot, and the SSB is located before the another SSB, a $1^{st}$ OFDM symbol located before the SSB is determined as a time domain region in the time frequency region.

Case 2: If there is no OFDM symbol between the SSB and another SSB that are in a same slot, and the SSB is located after the another SSB, a $2^{nd}$ OFDM symbol located after the SSB is determined as a time domain region in the time frequency region.

Case 3: If there are two OFDM symbols between the SSB and another SSB that are in a same slot, a $2^{nd}$ OFDM symbol located after the SSB is determined as a time domain region in the time frequency region.

As shown in FIG. 12, there may be two time location cases. In a first case, there is no OFDM symbol between two SSBs in a same slot. In the other case, there are two OFDM symbols between two SSBs in a same slot.

For the first time location case, an SSB 0 is located before an SSB 1, and a $1^{st}$ OFDM symbol located before the SSB 0 may be determined as the time domain region in the time frequency region of the PEI. Alternatively, an SSB 1 is located after an SSB 0, and a $2^{nd}$ OFDM symbol located after the SSB may be determined as the time domain region in the time frequency region of the PEI. Similarly, cases of an SSB 2 and an SSB 3 are the same as the foregoing. Details are not described herein again.

For the second time location case, there are two OFDM symbols between an SSB 0 and an SSB 1. For the SSB 0, a $2^{nd}$ OFDM symbol located after the SSB 0 may be determined as the time domain region in the time frequency region of the PEI. For the SSB 1, a $2^{nd}$ OFDM symbol located after the SSB 1 may be determined as the time domain region in the time frequency region of the PEI. Similarly, cases of an SSB 2 and an SSB 3 are the same as the foregoing. Details are not described herein again.

It may be understood that, regardless of a time location case used for sending the SSB, there may be two OFDM symbols between the time frequency region of the PEI and the SSS.

S1402: Receive the PEI in the determined time frequency region.

S1403: Determine, based on an indication of the PEI, whether there is the paging message sent to the terminal on the one or more POs.

That whether there is the paging message sent to the terminal on the one or more POs may include: There is the paging message sent to the terminal on each of the one or more POs, there is no paging message sent to the terminal on each of the one or more POs, or there is the paging message sent to the terminal on a part of the one or more POs, and there is no paging message sent to the terminal on the other part of the one or more POs.

The receiving in S1402 may also be understood as detection. S1402 may be replaced with: The terminal performs detection on the PEI in the determined time frequency region. If detecting the PEI, the terminal may determine, based on content of the PEI, whether there is the paging message sent to the terminal on the one or more POs, or may determine, based on a result that the PEI is detected, whether there is the paging message sent to the terminal on the one or more POs. Correspondingly, the terminal may determine, based on a result that no PEI is detected, that there is no paging message sent to the terminal on the one or more POs. In this case, S1403 may be replaced with: Determine, based on whether the PEI is detected, whether there is the paging message sent to the terminal on the one or more POs.

In the paging indication method described with reference to FIG. 14, for explanations of terms or a processing process, refer to the descriptions of the paging indication method described in FIG. 13. Therefore, explanations of some terms or processing processes are not described herein again.

The terminal may receive the PEI from the network device in the time frequency region of the PEI. The first interval may be different from the second interval. This reduces impact of a receiving position of the PEI on intra-frequency cell search and measurement of the existing terminal, helps to carry different terminal groups or indicate whether terminals on different POs are woken up, and further reduces power consumption.

Figure 15:
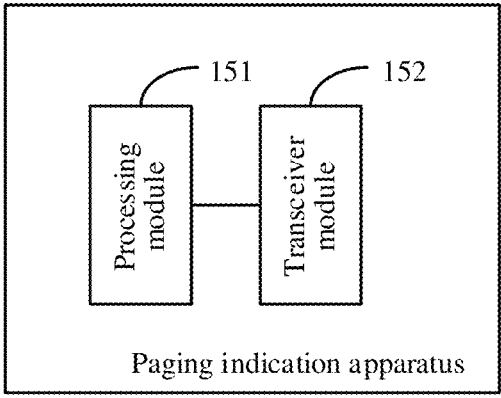
FIG. 15 is a schematic structural diagram of a paging indication apparatus according to an embodiment.

Next, FIG. 15 is a schematic structural diagram of a paging indication apparatus according to an embodiment. The apparatus may be used in a network device, for example, a gNB. As shown in FIG. 15, the paging indication apparatus may include a processing module 151 and a transceiver module 152.

The processing module 151 is configured to generate a PEI. The PEI indicates whether there is a paging message sent to a terminal on one or more POs.

The processing module 151 is further configured to determine a time frequency region for sending the PEI. The time frequency region corresponds to an SSB. A first interval is different from a second interval. The first interval is an interval between a start subcarrier of the PEI and a start subcarrier of the SSB, and the second interval is an interval between a start subcarrier of an SSS and the start subcarrier of the SSB.

The transceiver module 152 is configured to send, in the time frequency region, the PEI to the terminal.

The processing module 151 may be further configured to generate the PEI by using a pseudo-random sequence whose length is N, where N is any integer greater than or equal to 127.

The pseudo-random sequence whose length is N in a generating submodule and the PEI meet the following relationships:

$$d_{PEI}(n) = [1 - 2x_0((n + m_0) \bmod N)][1 - 2x_1((n + m_1) \bmod N)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 12$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

where $d_{PEI}(n)$ represents a sequence value of an $n^{th}$ symbol in the pseudo-random sequence whose length is N; a value range of n is greater than or equal to 0 and less than N;

$$N_{ID}^{cell}$$

represents a cell identifier of a cell of the network device, and includes two identifiers:

$$N_{ID}^{(1)}$$

and $$N_{ID}^{(2)};$$

initial values of $x_0$ and $x_1$ are preset values; and mod represents a modulo operation.

N is less than or equal to 240.

The first interval indicates at least one of the following: whether one or more terminal groups that receive the paging message on the one or more POs are paged; and whether there is the paging message sent to the terminal on the one or more PO groups in the one or more POs.

The time frequency region is a plurality of time frequency regions. The plurality of time frequency regions may be used to repeatedly send the PEI. Alternatively, the PEI is a plurality of PEIs, and the plurality of time frequency regions may be respectively used to send the plurality of PEIs.

The time frequency region occupies one OFDM symbol, and there are two OFDM symbols between the time frequency region and the SSS.

The processing module 151 may be further configured to: if there is no OFDM symbol between the SSB and another SSB that are in a same slot, and the SSB is located before the another SSB, determine a $1^{st}$ OFDM symbol located before the SSB as a time domain region in the time frequency region.

Alternatively, the processing module 151 may be further configured to: if there is no OFDM symbol between the SSB and another SSB that are in a same slot, and the SSB is located after the another SSB, determine a $2^{nd}$ OFDM symbol located after the another SSB as a time domain region in the time frequency region.

Alternatively, the processing module 151 may be further configured to: if there are two OFDM symbols between the SSB and another SSB that are in a same slot, determine a $2^{nd}$ OFDM symbol located after the SSB as a time domain region in the time frequency region.

It should be understood that the apparatus is configured to perform the paging indication method in the embodiment shown in FIG. 13. An implementation principle and a effect of a corresponding program module in the apparatus are similar to those described in the paging indication method in the embodiment shown in FIG. 13. For a working process of the apparatus, refer to the corresponding process in the paging indication method in the embodiment shown in FIG. 13. Details are not described herein again.

Figure 16:
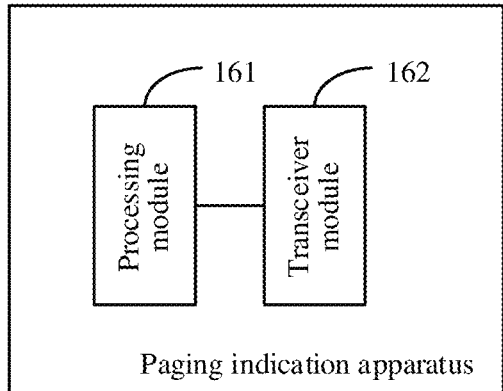
FIG. 16 is a schematic structural diagram of a paging indication apparatus according to an embodiment.

FIG. 16 is a schematic structural diagram of a paging indication apparatus according to an embodiment. The apparatus may be used in a terminal. As shown in FIG. 16, the paging indication apparatus may include a processing module 161 and a transceiver module 162.

The processing module 161 is configured to determine a time frequency region for receiving a PEI from a network device. The PEI indicates whether there is a paging message sent to a terminal on one or more POs. The time frequency region corresponds to an SSB. A first interval is different from a second interval. The first interval is an interval between a start subcarrier of the PEI and a start subcarrier of the SSB, and the second interval is an interval between a start subcarrier of an SSS and the start subcarrier of the SSB.

The transceiver module 162 is configured to receive the PEI in the time frequency region.

The processing module 161 is further configured to determine, based on an indication of the PEI, whether there is the paging message sent to the terminal on the one or more POs.

The PEI may be generated by using a pseudo-random sequence whose length is N, where N is any integer greater than or equal to 127.

N may be less than or equal to 240.

The first interval may indicate at least one of the following: whether one or more terminal groups that receive the paging message on the one or more POs are paged; and whether there is the paging message sent to the terminal on the one or more PO groups in the one or more POs.

The time frequency region is a plurality of time frequency regions. The plurality of time frequency regions may be used to repeatedly send the PEI. Alternatively, the PEI is a plurality of PEIs, and the plurality of time frequency regions are respectively used to send the plurality of PEIs.

The transceiver module 162 may be further configured to: if the plurality of time frequency regions may be used to repeatedly send the PEI, select one or more time frequency regions from the plurality of time frequency regions to receive the PEI.

Alternatively, the transceiver module 162 may be further configured to: if the plurality of time frequency regions may be respectively used to send the plurality of PEIs, receive the plurality of PEIs in the plurality of time frequency regions.

The time frequency region may occupy one OFDM symbol, and there are two OFDM symbols between the time frequency region and the SSS.

The processing module 161 may be further configured to: if there is no OFDM symbol between the SSB and another SSB that are in a same slot, and the SSB is located before the another SSB, determine a $1^{st}$ OFDM symbol located before the SSB as a time domain region in the time frequency region.

Alternatively, the processing module 161 may be further configured to: if there is no OFDM symbol between the SSB and another SSB that are in a same slot, and the SSB is located after the another SSB, determine a $2^{nd}$ OFDM symbol located after the SSB as a time domain region in the time frequency region.

Alternatively, the processing module 161 may be further configured to: if there are two OFDM symbols between the SSB and another SSB that are in a same slot, determine a $2^{nd}$ OFDM symbol located after the SSB as a time domain region in the time frequency region.

It should be understood that the apparatus is configured to perform the paging indication method in the embodiment shown in FIG. 14. An implementation principle and a effect of a corresponding program module in the apparatus are similar to those described in the paging indication method in the embodiment shown in FIG. 14. For a working process of the apparatus, refer to the corresponding process in the paging indication method in the embodiment shown in FIG. 14. Details are not described herein again.

Figure 17:
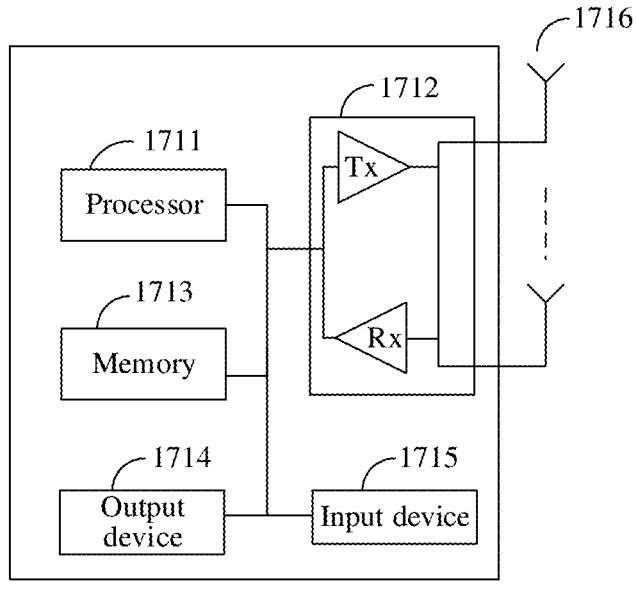
FIG. 17 is a schematic structural diagram of a terminal according to an embodiment.

FIG. 17 is a schematic structural diagram of a terminal according to an embodiment. The terminal may implement functions of the terminal in the foregoing method embodiments. For ease of description, FIG. 17 shows main components of the terminal. As shown in FIG. 17:

The terminal includes at least one processor 1711, at least one transceiver 1712, and at least one memory 1713. The processor 1711, the memory 1713, and the transceiver 1712 are connected to each other. Optionally, the terminal may further include an output device 1714, an input device 1715, and one or more antennas 1716. The antenna 1716 is connected to the transceiver 1712, and the output device 1714 and the input device 1715 are connected to the processor 1711.

The processor 1711 may be configured to: process a communication protocol and communication data, control the entire terminal, execute a software program, and process data of the software program.

In an optional implementation, the terminal may include a baseband processor and a central processing unit. The baseband processor may be configured to process the communication protocol and the communication data. The central processing unit may be configured to control the entire terminal, execute the software program, and process the data of the software program.

Functions of the baseband processor and the central processing unit may be integrated into the processor in FIG. 17. A person skilled in the art may understand that the baseband processor and the central processing unit each may be an independent processor and are interconnected by using a technology such as a bus. A person skilled in the art may understand that the terminal may include a plurality of baseband processors to adapt to different network standards, and the terminal may include a plurality of central processing units to enhance a processing capability of the terminal, and components of the terminal may be connected through various buses. The baseband processor may also be expressed as a baseband processing circuit or a baseband processing chip. The central processing unit may also be expressed as a central processing circuit or a central processing chip. The function of processing the communication protocol and the communication data may be built in the processor or may be stored in the memory in a form of a software program, and the processor executes the software program to implement a baseband processing function.

The memory 1713 may be configured to store the software program and the data. The memory 1713 may exist independently and is connected to the processor 1711. Optionally, the memory 1713 and the processor 1711 may be integrated together, for example, integrated in a single chip, such as in on-chip memory, or the memory 1713 is an independent storage element. This is not limited in embodiments. The memory 1713 can store program code for executing the embodiments, and the processor 1711 controls the execution. Various types of executed computer program code may also be considered as drivers of the processor 1711.

The transceiver 1712 may be configured to: perform conversion between a baseband signal and a radio frequency signal; and process the radio frequency signal. The transceiver 1712 may be connected to the antenna 1716. The transceiver 1712 includes a transmitter (Tx) and a receiver (Rx). The one or more antennas 1716 may receive a radio frequency signal. The receiver Rx in the transceiver 1712 is configured to: receive the radio frequency signal from the antenna, convert the radio frequency signal into a digital baseband signal or a digital intermediate frequency signal, and provide the digital baseband signal or the digital intermediate frequency signal for the processor 1711, so that the processor 1711 further processes, for example, demodulates and decodes, the digital baseband signal or the digital intermediate frequency signal. In addition, the transmitter Tx in the transceiver 1712 is configured to: receive a modulated digital baseband signal or digital intermediate frequency signal from the processor 1711, convert the modulated digital baseband signal or digital intermediate frequency signal into a radio frequency signal, and send the radio frequency signal via the one or more antennas 1716. The receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. Optionally, the transmitter Tx and the receiver Rx may be implemented by different physical structures/circuits or may be implemented by a same physical structure/circuit. In other words, the transmitter Tx and the receiver Rx may be inherited together.

The transceiver may also be referred to as a transceiver unit, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like. Alternatively, the Tx, the Rx, and the antenna may be combined into a transceiver.

The output device 1714 displays information in a plurality of manners. For example, the output device 1714 may be a liquid crystal display (LCD), a light emitting diode (LED) display device, a cathode ray tube (CRT) display device, a projector, or the like. The input device 1715 may receive an input of a user in a plurality of manners. For example, the input device 1715 may be a mouse, a keyboard, a touch-screen device, or a sensor device.

Figure 18:
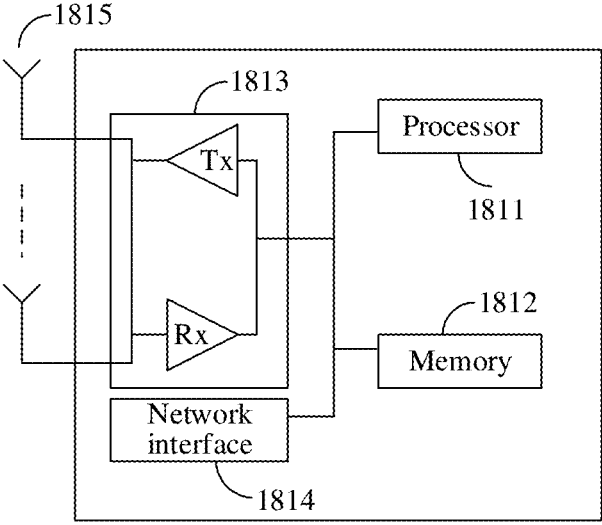
FIG. 18 is a schematic structural diagram of a network device according to an embodiment.

FIG. 18 is a schematic structural diagram of a network device according to an embodiment. The network device may implement functions of the network device in the foregoing method embodiments, for example, a gNB. For ease of description, FIG. 18 shows main components of the network device. As shown in FIG. 18:

The network device includes at least one processor 1811, at least one memory 1812, at least one transceiver 1813, at least one network interface 1814, and one or more antennas 1815. The processor 1811, the memory 1812, the transceiver 1813, and the network interface 1814 are connected to each other, for example, through a bus. In this embodiment, the connection may include various types of interfaces, transmission lines, buses, or the like. This is not limited in this embodiment. The antenna 1815 is connected to the transceiver 1813. The network interface 1814 is configured to enable the network device to be connected to another network device through a communication link.

For the transceiver 1813, the memory 1812, and the antenna 1816, refer to related descriptions in FIG. 17, to implement similar functions.

An embodiment may further provide a paging indication system, including a network device and a terminal. The network device may perform a paging indication method used on a network device side, and the terminal may perform a paging indication method used on a terminal side.

An embodiment may further provides a non-transitory computer storage medium. The non-transitory computer storage medium includes computer instructions. When the computer instructions are run, a paging indication method on a network device side is performed.

An embodiment may further provide a non-transitory computer storage medium. The non-transitory computer storage medium includes computer instructions. When the computer instructions are run, a paging indication method on a terminal side is performed.

An embodiment may further provide a computer program product. The computer program product includes computer instructions. When the computer instructions are run, a paging indication method on a network device side is performed.

An embodiment may further provide a computer program product. The computer program product includes computer instructions. When the computer instructions are run, a paging indication method on a terminal side is performed.

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or another programmable apparatus. The computer instructions may be stored in a non-transitory computer-readable storage medium. The non-transitory computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be understood that various numbers in the embodiments are merely used for differentiation for ease of description and are not used to limit the scope of the embodiments.

What is claimed is:
1. A paging indication method applied to a network device, the method comprising:
generating a paging early indication (PEI) by using a pseudo-random sequence whose length is N, wherein N is any integer greater than or equal to 127, wherein the PEI indicates whether there is a paging message sent to a terminal on one or more paging occasions (POs);
determining a time frequency region for sending the PEI, wherein the time frequency region corresponds to a synchronization signal block (SSB), a first interval is different from a second interval, a first interval is an interval between a start subcarrier of the PEI and a start subcarrier of the SSB, and the second interval is an interval between a start subcarrier of a secondary synchronization signal (SSS) and the start subcarrier of the SSB; and sending, in the time frequency region, the PEI to the terminal.

2. The paging indication method according to claim 1, wherein the pseudo-random sequence whose length is N and the PEI meet the following relationships:

$$d_{PEI}(n) = [1 - 2x_0((n + m_0) \bmod N)][1 - 2x_1((n + m_1) \bmod N)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 12$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

wherein $d_{PEI}(n)$ represents a sequence value of an $n^{th}$ symbol in the pseudo-random sequence whose length is N; a value range of n is greater than or equal to 0 and less than N;

$$N_{ID}^{cell}$$

represents a cell identifier of a cell of the network device, and comprises two identifiers:

$$N_{ID}^{(1)}$$

and $$N_{ID}^{(2)};$$

initial values of $x_0$ and $x_1$ are preset values; and mod represents a modulo operation.

3. The paging indication method according to claim 2, wherein N is less than or equal to 240.

4. The paging indication method according to claim 1, wherein the first interval indicates at least one of:

whether one or more terminal groups that receive the paging message on the one or more POs are paged; or whether there is the paging message sent to the terminal on the one or more PO groups in the one or more POs.

5. A paging indication method applied to a terminal, the method comprising:

determining a time frequency region for receiving a paging early indication (PEI) from a network device, wherein the PEI indicates whether there is a paging message sent to the terminal on one or more paging occasions (POs), the time frequency region corresponds to a synchronization signal block (SSB), a first interval is different from a second interval, the first interval is an interval between a start subcarrier of the PEI and a start subcarrier of the SSB, and the second interval is an interval between a start subcarrier of a secondary synchronization signal (SSS) and the start subcarrier of the SSB;

receiving the PEI in the time frequency region; and determining, based on an indication of the PEI, whether there is the paging message sent to the terminal on the one or more POs, and wherein the PEI is generated by using a pseudo-random sequence whose length is N, N being an integer greater than or equal to 127.

6. The paging indication method according to claim 5, wherein N is less than or equal to 240.

7. The paging indication method according to claim 5, wherein the first interval indicates at least one of:

whether one or more terminal groups that receive the paging message on the one or more POs are paged; and whether there is the paging message sent to the terminal on the one or more PO groups in the one or more POs.

8. The paging indication method according to claim 5, wherein the time frequency region is a plurality of time frequency regions, further comprising:

using the plurality of time frequency regions to repeatedly send the PEI; or the PEI is a plurality of PEIs, and the plurality of time frequency regions are respectively used to send the plurality of PEIs; and receiving the PEI in the time frequency region further comprises:

after using the plurality of time frequency regions to repeatedly send the PEI, selecting one or more time frequency regions from the plurality of time frequency regions to receive the PEI; or after using the plurality of time frequency regions respectively to send the plurality of PEIs, receiving the plurality of PEIs in the plurality of time frequency regions.

9. A paging indication apparatus, comprising one or more processors, wherein the one or more processors are configured to:

generate a paging early indication (PEI) by using a pseudo-random sequence whose length is N, wherein N is any integer greater than or equal to 127, wherein the PEI indicates whether there is a paging message sent to a terminal on one or more paging occasions (POs);

determine a time frequency region for sending the PEI, wherein the time frequency region corresponds to a synchronization signal block (SSB), a first interval is different from a second interval, the first interval is an interval between a start subcarrier of the PEI and a start subcarrier of the SSB, and the second interval is an interval between a start subcarrier of a secondary synchronization signal (SSS) and the start subcarrier of the SSB; and send, in the time frequency region, the PEI to the terminal.

10. The paging indication apparatus according to claim 9, wherein the pseudo-random sequence whose length is N and the PEI meet the following relationships:

$$d_{PEI}(n) = [1 - 2x_0((n + m_0) \bmod N)][1 - 2x_1((n + m_1) \bmod N)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 12$$

$$N_{ID}^{cell} = 3N_{ID}^{(1)} + N_{ID}^{(2)}$$

$$x_0(i + 7) = (x_0(i + 4) + x_0(i)) \bmod 2$$

$$x_1(i + 7) = (x_1(i + 1) + x_1(i)) \bmod 2,$$

wherein $d_{PEI}(n)$ represents a sequence value of an $n^{th}$ symbol in the pseudo-random sequence whose length is N; a value range of n is greater than or equal to 0 and less than N;

$$N_{ID}^{cell}$$

represents a cell identifier of a cell of the network device, and comprises two identifiers:

$$N_{ID}^{(1)}$$

and $$N_{ID}^{(2)};$$

initial values of $x_0$ and $x_1$ are preset values; and mod represents a modulo operation.

11. The paging indication apparatus according to claim 9, wherein N is less than or equal to 240.

12. The paging indication apparatus according to claim 9, wherein the first interval indicates at least one of:

whether one or more terminal groups that receive the paging message on the one or more POs are paged; or whether there is the paging message sent to the terminal on the one or more PO groups in the one or more POs.

13. A paging indication apparatus, comprising one or more processors, wherein the one or more processors are configured to:

determine a time frequency region for receiving a paging early indication (PEI) from a network device, wherein the PEI indicates whether there is a paging message sent to the terminal on one or more paging occasions (POs), the time frequency region corresponds to a synchronization signal block (SSB), a first interval is different from a second interval, the first interval is an interval between a start subcarrier of the PEI and a start subcarrier of the SSB, and the second interval is an interval between a start subcarrier of a secondary synchronization signal (SSS) and the start subcarrier of the SSB; and a transceiver module, configured to receive the PEI in the time frequency region, wherein the processing module is further configured to determine, based on an indication of the PEI, whether there is the paging message sent to the terminal on the one or more POs, and wherein the PEI is generated by using a pseudo-random sequence whose length is N, N being an integer greater than or equal to 127.

14. The paging indication apparatus according to claim 13, wherein N is less than or equal to 240.

15. The paging indication apparatus according to claim 13, wherein the first interval indicates at least one of:

whether one or more terminal groups that receive the paging message on the one or more POs are paged; and whether there is the paging message sent to the terminal on the one or more PO groups in the one or more POs.

16. The paging indication apparatus according to claim 13, wherein the time frequency region is a plurality of time frequency regions, wherein the one or more processors are further configured to:

use the plurality of time frequency regions to repeatedly send the PEI; or the PEI is a plurality of PEIs, and the plurality of time frequency regions are respectively used to send the plurality of PEIs; and the one or more processors are further configured to:

use the plurality of time frequency regions to repeatedly send the PEI and then selecting one or more time frequency regions from the plurality of time frequency regions to receive the PEI; or use the plurality of time frequency regions respectively to send the plurality of PEIs and then receiving the plurality of PEIs in the plurality of time frequency regions.

\* \* \* \* \*